(12) United States Patent
Parks

(10) Patent No.: US 11,087,891 B2
(45) Date of Patent: Aug. 10, 2021

(54) METHODS AND APPARATUS FOR MITIGATING PLASMA DISRUPTION IN FUSION DEVICES

(71) Applicant: General Atomics, San Diego, CA (US)

(72) Inventor: Paul Brownlee Parks, San Diego, CA (US)

(73) Assignee: General Atomics, San Diego, CA (US)

( * ) Notice: Subject to any disclaimer, the term of this patent is extended or adjusted under 35 U.S.C. 154(b) by 590 days.

(21) Appl. No.: 15/851,542

(22) Filed: Dec. 21, 2017

(65) Prior Publication Data

US 2019/0198182 A1 Jun. 27, 2019

(51) Int. Cl.
*G21B 1/15* (2006.01)
*G21B 1/05* (2006.01)

(52) U.S. Cl.
CPC .............. *G21B 1/057* (2013.01); *G21B 1/15* (2013.01)

(58) Field of Classification Search
CPC . G21B 1/00; G21B 1/05; G21B 1/052; G21B 1/055; G21B 1/057; G21B 1/11; G21B 1/15; G21B 1/21
See application file for complete search history.

(56) References Cited

U.S. PATENT DOCUMENTS

| | | | | |
|---|---|---|---|---|
| 3,668,067 A | * | 6/1972 | Christofilos | H05H 1/22 376/126 |
| 3,953,617 A | * | 4/1976 | Smith | G21B 1/19 427/6 |
| 7,831,008 B2 | | 11/2010 | Parks et al. | |

OTHER PUBLICATIONS

Bardoel, Agatha, "Cryogenic deuterium machine gun corrals edgy plasma", https://www.usiter.org/news/cryogenic-deuterium-machine-gun-corrals-edgy-plasma, US ITER, 5 pages, May 3, 2012.
Bardoel, Agatha, "ORNL's Fusion Pellet Fueling Lab Innovations Support US ITER Systems", https://www.usiter.org/news/ornls-fusion-pellet-fueling-lab-innovations-support-us-iter-systems, US ITER, 5 pages, Jan. 3, 2012.
Baylor, L.R. et al., "Shattered pellet injection technology design and characterization for disruption mitigation experiments", IAEA nuclear fusion, IOP Publishing, 9 pages, Apr. 26, 2019.
Callis, R.W. et al., "Alternate Concepts for Generating High Speed DT Pellets for Fueling ITER", General Atomics Report GA-A26037, 5 Pages, May 2008.
Chi, T.C., "Electrical Resistivity of Alkaline Earth Elements", J. Physical and Chemical Reference Data 8, 439, 1979.
Chi, T.C., "Electrical Resistivity of Alkali Elements", J. Physical and Chemical Reference Data 8, 339, 1979.

(Continued)

*Primary Examiner* — Marshall P O'Connor
(74) *Attorney, Agent, or Firm* — Perkins Coie LLP

(57) ABSTRACT

Exemplary pellets can be used for magnetic fusion devices for mitigating plasma disruption. In some embodiments, the pellets may be cryogenically cooled that may cause a rise in the electrical conductivity of the pellets. A high conductivity of the pellet can screen out the plasma's magnetic field from the interior of the pellet. The screening out of the plasma's magnetic field can slow the ablation rate of the pellet which may allow for deeper pellet penetration and a better suited spatial profile of deposited material for proper mitigation of the plasma disruption. In some other embodiments, the pellets may not be cryogenically cooled.

13 Claims, 6 Drawing Sheets

(56) References Cited

OTHER PUBLICATIONS

Creely, A.J. et al., "Overview of the SPARC tokamak", J. Plasma Phys., Cambridge University Press, vol. 86, 25 pages, Sep. 10, 2020.
De Vries, P.C. et al., "Requirements for Triggering the ITER Disruption Mitigation System", Fusion Science and Technology, 69:2, pp. 471-484, 2016.
Degitz, Lynne, "Neutronics at Wisconsin, ORNL advances ITER shielding and international collaboration", https://www.usiter.org/news/neutronics-wisconsin-ornl-advances-iter-shielding-and-international-collaboration, US ITER, 5 pages, Jun. 18, 2012.
Degitz, Lynne, "Shooting selected pellets into the plasma", https://www.iter.org/newsline/-/2471, ITER newsline, 2 pages, Jun. 13, 2016.
Degitz, Lynne, "US ITER high-performance pellet injection system advances to next stage", https://www.usiter.org/news/us-iter-high-performance-pellet-injection-system-advances-next-stage, US ITER, 5 pages, Sep. 16, 2013.
Hollmann, E.M. et al., "Effect of applied toroidal electric field on the growth/decay of plateau-phase runaway electron currents in DIII-D", Nuclear Fusion 51, (2011), 103026.
Hollmann, E.M. et al., "Status of research toward the ITER disruption mitigation system", Physics of Plasmas, vol. 22, 16 pages, Nov. 17, 2014.
Hutchinson, I.H., "Ion collection by a sphere in a flowing plasma: 3. Floating potential and drag force" Plasma Phys. Control. Fusion, 47: pp. 71-87, 2005.
ITER Science Division, "A task force to face the challenge", https://www.iter.org/newsline/-/3183, ITER newsline, 3 pages, Nov. 26, 2018.
Lehnen, M. et al., "Disruptions in ITER and strategies for their control and mitigation", Journal of Nuclear Materials, vol. 463, pp. 39-48, Nov. 1, 2014.
Loarte, Alberto, "Required R&D in Existing Fusion Facilities to Support the ITER Research Plan", ITER Technical Report, Report No. ITR-20-008, 43 pages, Sep. 22, 2020.
Rasmussen, David, "Pellet Injection", https://www.usiter.org/sites/default/files/2018-11/PI_0.pdf, US ITER Project Office, 2 pages, Nov. 2018.
Sweeney, R., "MHD stability and disruptions in the SPARC tokamak", J. Plasma Phys., Cambridge University Press, vol. 86, 32 pages, Sep. 1, 2020.
Wikipedia, "National Ignition Facility", https://en.wikipedia.org/wiki/National_Ignition_Facility, Wikipedia, obtained Nov. 3, 2020.
Furth, Harold P., "Nonideal magnetohydrodynamic instabilities and toroidal magnetic confinement", American Institute of Physics, vol. 28, pp. 1595-1611, Jan. 1985.

* cited by examiner

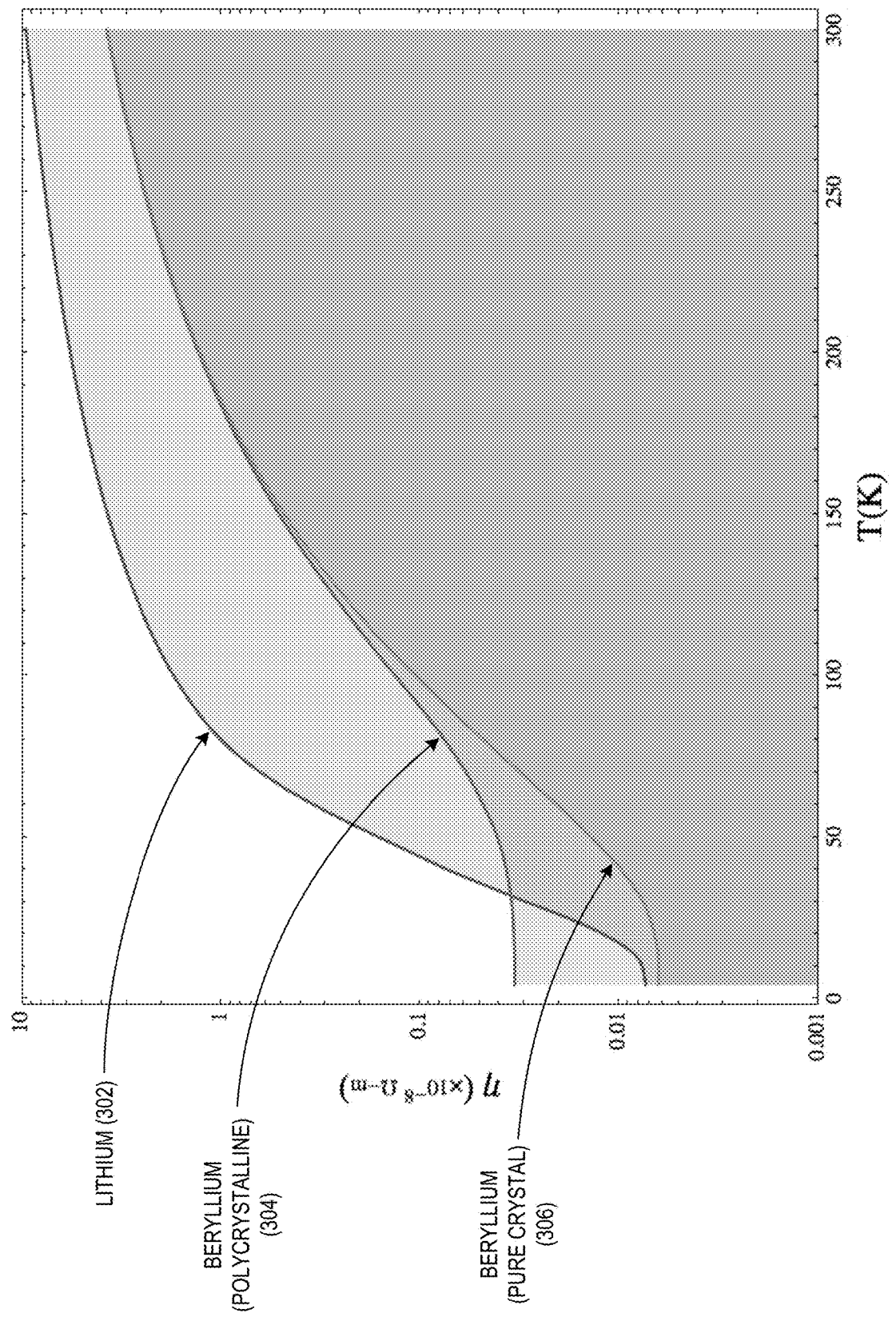

METHODS AND APPARATUS FOR MITIGATING PLASMA DISRUPTION IN FUSION DEVICES

TECHNICAL FIELD

This patent document relates to systems, devices, and processes for thermonuclear fusion technologies.

BACKGROUND

A tokamak is a device that uses a magnetic field to spatially confine plasma, e.g., in a shape of a torus to produce high-temperature plasma needed for producing controlled thermonuclear fusion power. Magnetic fields are used in tokamak devices for confinement in part because solid materials cannot withstand extremely high temperatures of the plasma for thermonuclear fusion. In a tokamak, stable plasma equilibrium can be achieved by producing magnetic field lines that move around the torus in a helical shape. Such a helical field can be generated by adding a toroidal field that travels around the torus in circles and a poloidal field that travels in circles orthogonal to the toroidal field. In implementations, the toroidal field can be produced by electromagnets that surround the torus, and the poloidal field can be produced by a toroidal electric current that flows inside the plasma and may be induced inside the plasma by, e.g., using a second set of electromagnets.

At large toroidal currents, various magnetic confinement fusion devices tend to exhibit undesired plasma instabilities. The nonlinear evolution of such plasma instabilities can lead to a quench of the plasma current within a short period time, e.g., around milliseconds. This quench can create energetic runaway electrons that escape the spatially confined plasma and can potentially lead to a rapid loss of plasma confinement. Such runaway electrons can collide with components that face the plasma and can damage the components by, e.g., inflicting intense heat in such components. This phenomenon is called a plasma disruption.

SUMMARY

Techniques, systems, and devices are disclosed for exemplary pellets that can be used for magnetic fusion devices for mitigating plasma disruption. The exemplary pellets can mitigate plasma disruptions while penetrating the plasma. Thus, the disclosed technology can enhance the penetration depth of the pellets and can allow the pellets to reach the central core of the plasma. The exemplary pellets can also be introduced into the magnetic fusion devices in the form of a hollow shell comprising an interior payload of small granules or porous material, thereby diminishing the potential for damage to the far wall of the magnetic fusion device in the event of accidental impact.

An exemplary embodiment discloses a fusion device. The exemplary fusion device comprises a plasma vessel structured to include a hollow interior to confine plasma, a plurality of toroidal field coils wound around different portions of an outer surface of the plasma vessel, the plurality of toroidal field coils configured to magnetically confine plasma inside the plasma vessel, a storage device that stores pellets, and a pellet injector positioned to receive pellets from the storage device and operable to inject the pellets into the plasma vessel.

In some embodiments, the storage device is a cryostat storage device that stores and cools pellets, and wherein the pellets have metallic exteriors. In some embodiments, wherein the cryostat storage device is configured to cool the plurality of pellets to less than or equal to 40 kelvin (K). In some embodiments, the cryostat storage device is configured to cool the plurality of pellets to 10 kelvin (K).

In some embodiments, the pellets include solid pellets. In some embodiments, the pellets include hollow shell pellets. In some embodiments, each hollow shell pellet encapsulates a payload. In some embodiments, the payload comprises granules or a porous material. In some embodiments, the payload comprises lithium, lithium deuteride, beryllium, beryllium deuteride, boron, boron nitride, or tungsten. In some embodiments, each pellet includes lithium or beryllium.

In some embodiments, the plasma vessel is shaped as a D-shaped torus. In some embodiments, the pellet injector includes a single-stage light gas gun.

In some other embodiments, each pellet includes a hollow shell that encapsulates a payload. In some other embodiments, the hollow shell comprises lithium, lithium deuteride, beryllium, beryllium deuteride, or boron nitride. In some other embodiments, the payload comprises lithium, lithium deuteride, beryllium, beryllium deuteride, boron, boron nitride, or tungsten.

Another embodiment discloses a method of mitigating plasma disruption. The exemplary method comprises magnetically confining plasma in a plasma vessel, storing pellets, and injecting the stored pellets into the plasma vessel. In some embodiments, the exemplary method further comprises cooling the stored pellets to less than or equal to 40 kelvin (K). In some embodiments, the stored pellets are cooled to approximately 10 kelvin (K).

BRIEF DESCRIPTION OF THE DRAWINGS

FIG. 3 shows a plot of resistivity versus temperature for the exemplary lithium and beryllium samples.

DETAILED DESCRIPTION

Figure 1:
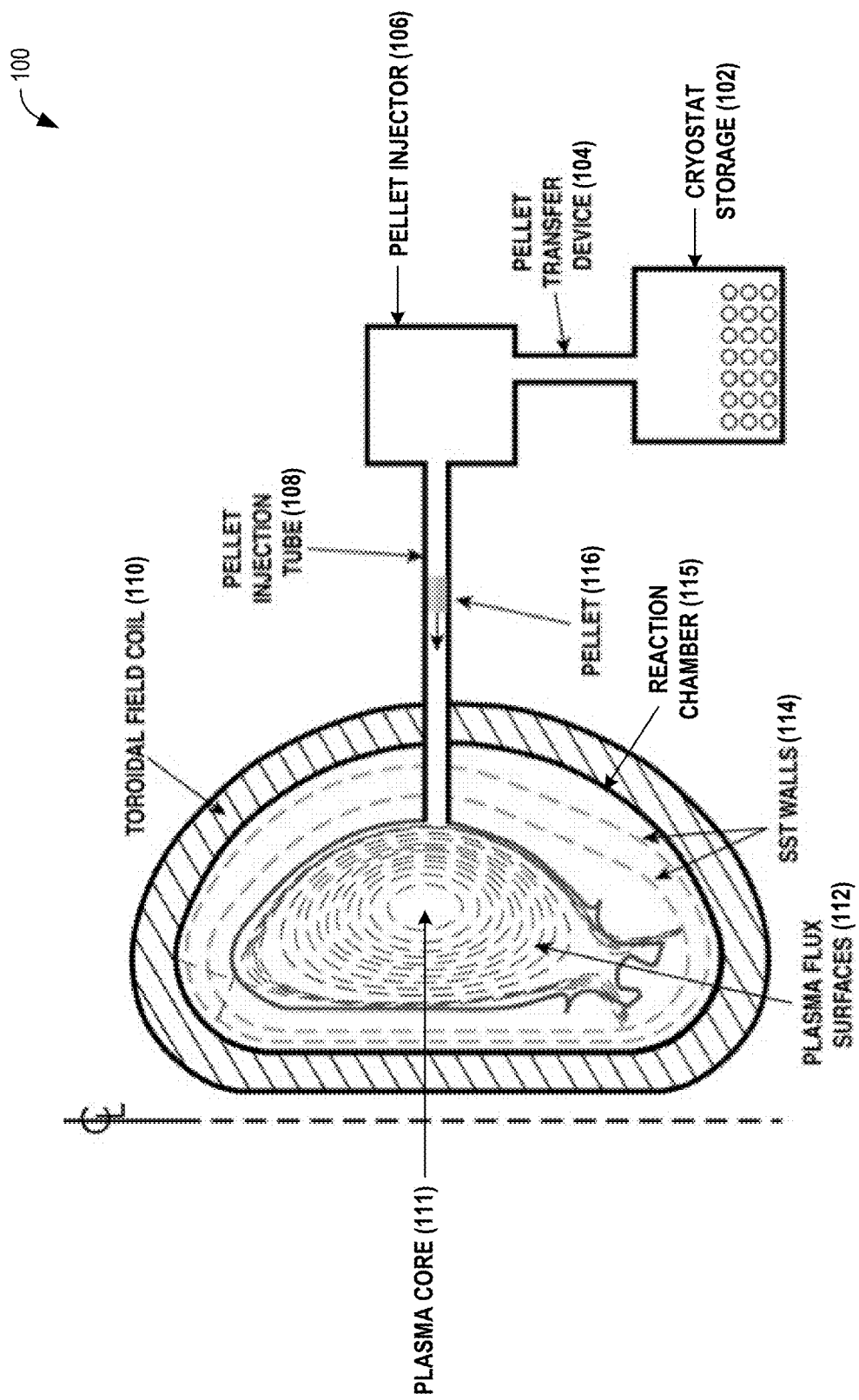
FIG. 1 shows a cross section view of an exemplary magnetic fusion device.

Based on the disclosed technology in this document, in operating a magnetic confinement fusion device such as tokamak, pellets can be injected into hot fusion plasma to mitigate the undesired plasma disruption. However, the injected pellets tend to rapidly vaporize due to the heating caused by the hot fusion plasma. This vaporization can limit the depth of penetration of the injected pellets into the hot fusion plasma. Penetration of the pellets to the core of the confined plasma before completely vaporizing can mitigate an undesired plasma disruption. The interaction of the plasma with the ablated material of the pellets can cause the plasma to radiate away its thermal energy thereby spreading it over a wide area instead of allowing an uncontrolled loss of thermal energy to the surrounding plasma facing components of the fusion device. Plasmas can be confined by nested magnetic flux surfaces, but when these surfaces are broken during a plasma disruption, the thermal energy of the plasma can rapidly escape to the surrounding material structures causing damage. The disclosed technology in this document can be used to mitigate plasma disruptions based in part on engineering and control of the chemical composition, the structure, or the temperature of the exemplary pellets. In some embodiments, the structure of the exemplary pellets can include a shell and materials inside the shell known as payload. The shell and the payload once dispersed into the plasma can be ionized by the plasma and can allow energy to radiate out of the plasma. The exemplary pellets can aide in mitigating plasma disruption in part because the shell of the pellets can be used to carry at least some of the payload into the plasma before some portion of the payload begins to ionize. The exemplary embodiments disclose both cooled and non-cooled pellets that can differ in how far the shell can penetrate into the plasma before the shell disintegrates releasing both the shell material and the payload into the plasma.

The exemplary embodiments first describe pellets that can be cryogenically cooled prior to introducing the pellet in a magnetic confinement fusion device. The cooled pellets may have solid forms or hollow shell forms. Each cooled pellet may include lithium or beryllium. The cooled pellet with a hollow shell form can encapsulate a payload. The payload of a cooled pellet may comprise granules or a porous material. The payload of a cooled pellet may comprise lithium, lithium deuteride, beryllium, beryllium deuteride, boron, boron nitride, or tungsten.

The exemplary embodiments also describe pellets that may not be cryogenically cooled prior to introducing the pellet in a magnetic confinement fusion device. The pellet that is not cooled may include a hollow shell that encapsulates a payload. The hollow shell of the pellets that are not cooled may comprise lithium, lithium deuteride, beryllium, beryllium deuteride, or boron nitride. The payload of the pellets that are not cooled may comprise lithium, lithium deuteride, beryllium, beryllium deuteride, boron, boron nitride, or tungsten Turning to embodiments that use cryogenic treatment, examples of suitable pellets may include pellets having metallic exteriors which may include a metal with a low atomic number (Z). The exemplary pellets may optionally be placed inside a cryostat at a cryogenically low temperature that causes a rise in the electrical conductivity of the cooled pellets. The cooled pellets can be transferred to a pellet gun and accelerated to a desired high velocity into a magnetic fusion device, such as a tokamak. The high conductivity of the pellets can screen out the plasma's magnetic field from the interior of each pellet. This screening slows the ablation rate of the pellet allowing for deeper pellet penetration and a better suited spatial profile of deposited material for proper mitigation of the plasma disruption.

FIG. 1 shows a cross section of an exemplary magnetic fusion device (100) where a cryogenically cooled pellets (116) are injected into a plasma vessel (115) that is used to spatially confine magnetized plasma (111) in the shape of a torus. As indicated by the center line ($C_L$) on the left of FIG. 1, the plasma vessel (115) may be constructed as a D-shaped torus. The magnetic field region of the plasma core (111) is enclosed by a magnetic cage that includes multiple toroidal field coils (110). The magnetic cage may be formed by a plurality of toroidal field coils (110) that are wound around different portions of the outer surface of the plasma vessel. The magnetic cage is structured to magnetically confine the plasma (111).

The cross section of the plasma (111), which forms a torus with axis of symmetry ($C_L$) indicated by the dotted line on the left. The field may be initially excluded from the interior of the exemplary pellet (116) once the pellet crosses the magnetic cage. The white region within the final closed flux surface represents the plasma core (111).

In some embodiments, a pellet injector (106) is used to inject the exemplary pellets (116) into the plasma (111). For example, the pellet injector (106) may include a single-stage light gas gun. The interaction of the plasma with the ablated material of an exemplary pellet (116) causes the plasma (111) to radiate away its thermal energy thereby spreading it over a wide area instead of allowing an uncontrolled loss of thermal energy to the surrounding plasma facing components. Plasmas (111) can be confined by nested magnetic flux surfaces (112). The same magnetic field that confines the plasma can also be manipulated to control the ablation rate of the pellet (116).

Figure 2:
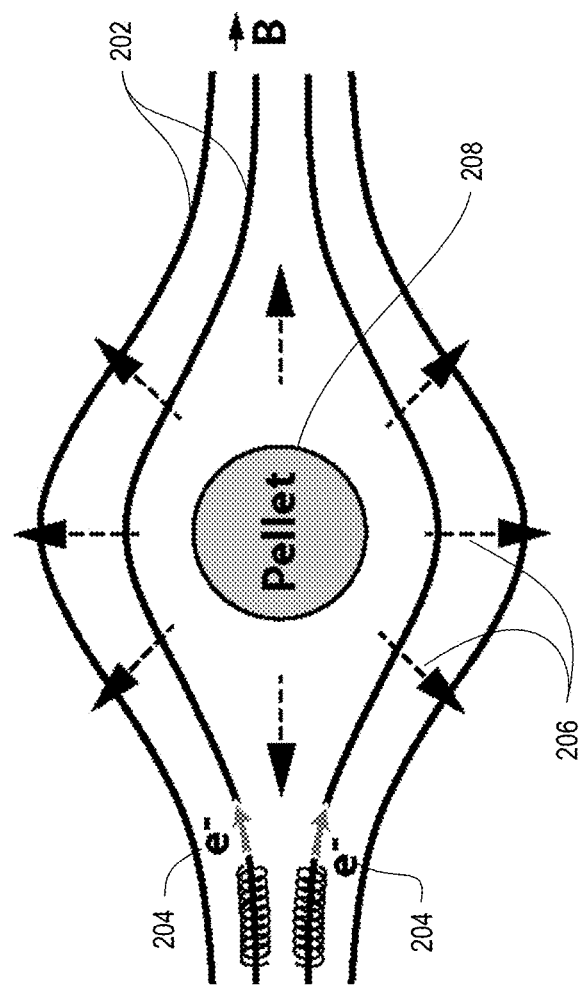
FIG. 2 shows the concept of magnetic shielding for an exemplary pellet.

FIG. 2 shows an exemplary embodiment where a magnetic screening (206) of an exemplary pellet (208) diverts the plasma's magnetic field (202) around the pellet. The plasma electrons (204) follow the magnetic field lines (202), which are excluded, from the interior of the metallic pellet (208) by the diamagnetic effect. Further, the heat flux impinging on the pellet (208) is carried by plasma electrons (204), which are strongly magnetized because they are pinned to the magnetic lines of force (202). Consequently, when these lines of force (202) are diverted around the pellet (208) the heat flux will also be diverted around the pellet. As a result the vaporization rate of the pellet can be reduced, thus allowing for deeper penetration of the pellet into the interior of the plasma.

The physical mechanism that causes the magnetic field lines (202) to be diverted around a metallic pellet (208) is a diamagnetic phenomenon. The exemplary pellet (208) may be either in a solid form or in the form of a hollow shell of a suitable geometry such as a hollow spherical shell. The hollow interior of a hollow shell can be filled with a payload material. In some embodiments, the payload may be in the form of loosely packed granules, e.g., in the size range of 10 to 200 microns in some implementations. In some other embodiments, the payload may be in the form of a porous material.

In some embodiments, the exemplary pellet (208) used in disruption mitigation may include a solid that includes a low-Z metal or light metal such as lithium or beryllium. In some embodiments, the exemplary pellet (208) used in disruption mitigation may include a hollow shell form where the outer shell material for the pellet is comprised of either lithium or beryllium. In an exemplary embodiment, the payload inside the hollow shell may include low-Z material, such as one or more of lithium (Li), lithium deuteride (LiD), beryllium (Be), beryllium deuteride (BeD), boron (B), boron nitride (BN), and tungsten (W).

In some embodiments, the electrical conductivity of low-Z or light metal elements such as lithium or beryllium can be increased by 100 to 1000 times the room temperature value by cooling these materials down to approximately 10 kelvin (K) using a suitable cryostat storage device (102). In some embodiments, high electrical conductivity can be achieved for low-Z light metal pellets of lithium or beryllium for disruption mitigation in magnetic fusion device plasmas such in tokamaks by cooling pellets to 40 K or less using the cryostat storage device (102). Lithium and beryllium materials are non-magnetic crystalline solid metals for which the temperature dependence of the electrical conductivity arises from electron-phonon scattering. In this case the resistivity $\rho$ (inverse of electrical conductivity, $\rho=1/\sigma$) is given by the following Block-Gruneisen formula:

$$\rho = \rho(0) + \alpha \rho * \left(\frac{T}{\Theta_D}\right)^5 \int_0^{\Theta_D/T} \frac{x^5 dx}{(e^x-1)(1-e^{-x})}$$

where $\rho(0)$ is the residual resistivity at zero temperature due to electron scattering from crystal defects or impurities, and the second term is the temperature dependent part arising from electron-phonon interaction, $\Theta_D$ is the Debye temperature, $\rho_*$ is the resistivity at this temperature, and $\alpha=4.225$ is a numerical constant. At temperatures well below the Debye temperature, typically approximately 300-400 K, the resistivity falls dramatically as $T^5$ approaches zero.

FIG. 3 shows a plot of electrical resistivity versus temperature for lithium sample, (Li) (302), and beryllium sample, (Be) (polycrystalline (304); pure crystal (306)). FIG. 3 shows that the electrical conductivity improves dramatically on cooling to low temperatures, especially near absolute zero, although the residual resistivity at zero temperature is apparent. The residual resistivity varies from sample to sample depending on how the sample is prepared and how pure it is.

The high conductivity brought about by pre-cooling the pellets can make the diffusion time of the magnetic field into the pellet $$\tau_d \sim \mu_0 \sigma r_p^2$$

comparable to the penetration of the pellet with velocity V $$\tau_p \sim a/V$$

where $\sigma$ is the electrical conductivity, $\mu_0$ is the permeability of free space equal to $4\pi \times 10^{-7}$, $r_p$ is the pellet radius, and a is the minor radius of the plasma.

Returning to FIG. 1, the pellet (116) may be injected at some distance from the plasma (111) where there is no magnetic field. The pellet injector (106) is coupled to the plasma vessel (115). In some embodiments, the pellet injector (106) may inject the pellet (116) into the pellet injection tube (108). One end of the pellet injection tube (108) is connected to the pellet injector (106), and another end of the pellet injection tube (108) may be coupled to the plasma vessel (115) and may extend past the toroidal field coils (110) and the stainless steel (SST) walls (114). Injecting the pellet (116) through a pellet injection tube (108) at some distance from the toroidal field coils (110) allows the pellet to have no field in its interior when it enters the magnetic cage of the magnetic fusion device. Once the pellet (116) is inside the magnetic cage the field is initially excluded from the pellet's interior by circulating eddy currents on the pellet's surface. These eddy currents, by Lenz's law, oppose the diffusion of the magnetic field into the pellet for some amount of time. The soaking in time or magnetic diffusion time depends on the electrical conductivity of the pellet.

In some embodiments, the magnetic fusion device includes cryostat storage device (102) for storing the pellets (116). The cryostat storage device (102) is connected to the pellet injector (106). In some embodiments, the cryostat storage device (102) can be connected to the pellet injector (106) by a pellet transfer device (104). By using the cryostat storage device (102), the electrical conductivity of the pellet is increased by pre-cooling the pellet to ultra-low temperature. In some embodiments, the pellets may be cooled to near absolute zero by immersing the pellets in a liquid helium bath. In some embodiments, the pellets may be cooled in a liquid helium bath to less than or equal to 40 kelvin (K). In an exemplary embodiment, the pellets may be cooled in a liquid helium bath to approximately 10 kelvin (K).

FIG. 1 shows an exemplary cross section of a magnetic fusion device (100) showing the plasma (111) with nested magnetic flux surfaces (112) which confine the plasma, and the location of the toroidal magnetic field coils (110) which produce the strong magnetic field inside the plasma (coming out of the page), with zero magnetic field outside the toroidal coil cage. In some embodiments, the pellets (116) are stored in a cryostat storage device (102) and cooled to 40 K before they are injected into the plasma (111) at high velocity V. Since the pellets (116) are launched in a field-free region the pellets have no magnetic field inside.

When the pellets exit the pellet injection tube (108), they are suddenly exposed to the toroidal magnetic field, which is suddenly screened from the interior of the pellet by the diamagnetic effect. As the pellet (116) transits the plasma (111) the field is screened out by the diamagnetic currents flowing on the surface of the pellet, thereby reducing the plasma heat flux falling on the surface of the pellet. The characteristic time for diffusion of the field into the pellet $\tau_d$ is comparable to the time $\tau_p$ for the pellet to reach the central region of the plasma that can be about 4 ms for a pellet injected into the magnetic fusion device at a velocity of approximately 500 m/s. Without magnetic shielding the pellet may completely vaporize before reaching the plasma core. The pellet still has a small residual resistivity, so that the field diffuses into the pellet on the characteristic time scale $\tau_d$ set by the residual.

FIGS. 4A-4D show simulations of the magnetic configuration surrounding an exemplary ablating light metal pellet cooled to 40 K, where $t'=t/\tau$, $\tau=\mu_0 \sigma r_p^2/\pi^2$, $r_p$ is the pellet radius, and $\sigma$ is the electrical conductivity of the pellet. The simulations shown in FIGS. 4A-4D use spherical coordinate system $(r,\vartheta,\phi)$ where the center of the pellet (400) is located at the origin r=0. The pellet (400) is normalized to a unit circle r=1. FIGS. 4A-4D show actually projections of the fields and the flows on a constant $\phi$ plane cutting through the symmetry axis $\vartheta=0$ which in the figure corresponds to the x-axis, so that x=r cos $\vartheta$ and y=r sin $\vartheta$. The solid lines drawn from the left to the right of each figure denote selected magnetic streamlines. The annular region between the surface of the pellet (400) on the unit circle, and the first dotted line (402) is the neutral gas part of the ablation flow. The second dotted line (404) illustrates the surface where there is a shock, transitioning the purely radial flow along the r direction to parallel flow along the distorted magnetic field lines. The region between the first dotted line (402) and the second dotted line (404) is the ionized ablation flow region.

Figure 4A:
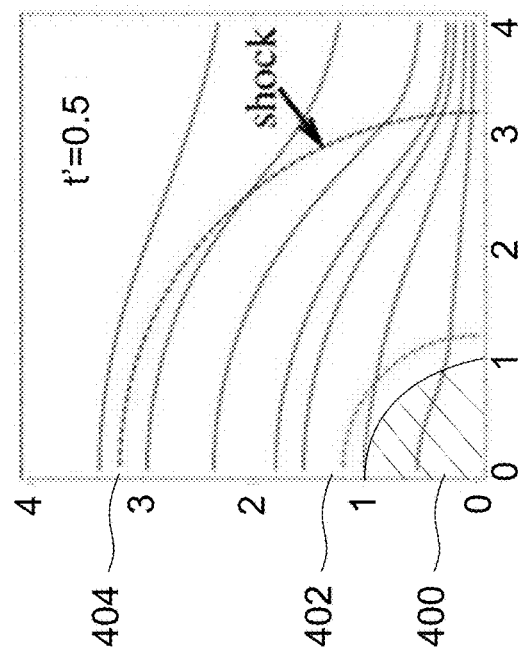
FIGS. 4A-4D show simulations of the magnetic configuration surrounding an exemplary ablating light metal pellet cooled to 40 kelvin (K).
Figure 4C:
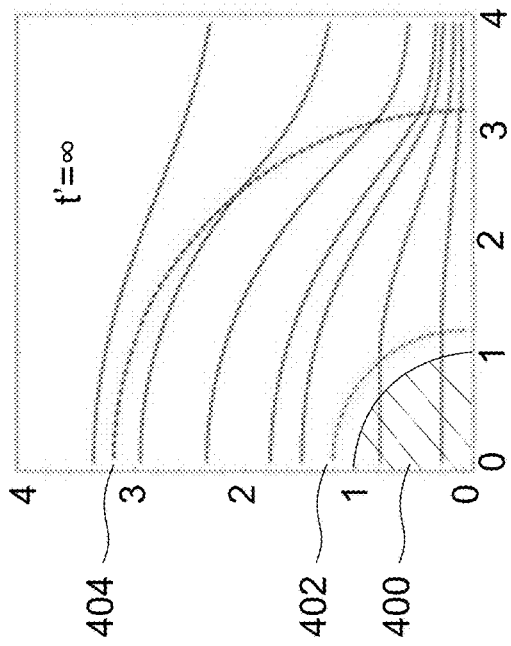
Figure 4B:
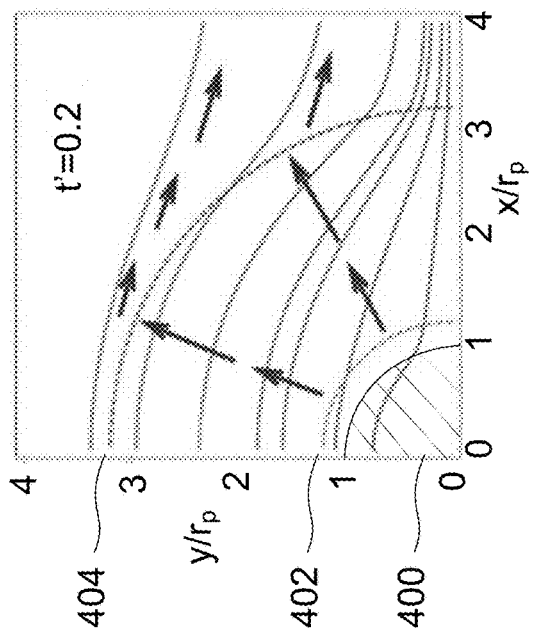
Figure 4D:
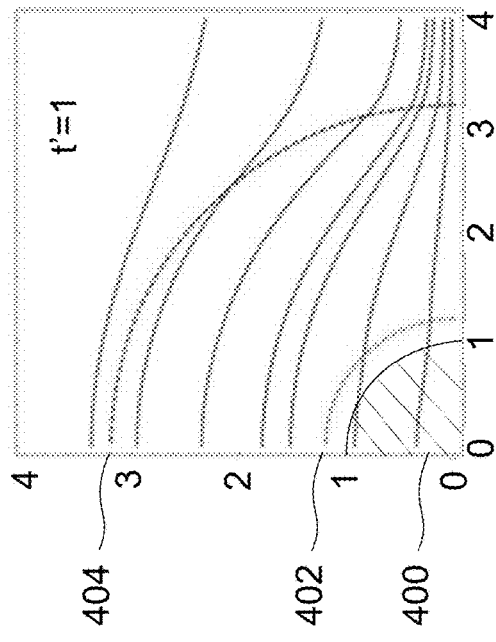

In FIG. 4A, the arrows show ablation flow vectors near ablating pellet. Diffusion of field into the pellet, known as eddy current decay, is incomplete because of outward ionized ablation flow. The field at t=0 is initially completely excluded from the pellet, initially reducing the heat flux to zero. For t>0, the magnetic field diffuses into the pellet while the pellet is moving through the plasma. Due to the outward flow of ablated and ionized gas the magnetic field inside the pellet can be still reduced even for long times.

Further analysis includes the time evolution of the magnetic field structure near the pellet, assuming that the currents and magnetic fields remain axisymmetric, where the axis of symmetry is in the direction of the straight undisturbed magnetic field far away from the pellet. In this exemplary model, the magnetic screening effect is enhanced by the outward expansion of the ablated and ionized gas. The ablation outflow is relatively undisturbed near the pellet where its pressure is considerably larger than the magnetic pressure. Thus, near the pellet, the outflow is nearly spherically symmetric and can flow across the magnetic field. A flow of ionized gas across a magnetic field induces an electromagnetic field (EMF), which by Ohms law creates an azimuthal current within the ionized gas. This current flows in the same direction as the eddy current flowing in the pellet. The two currents add, thereby enhancing the screening effect in the immediate vicinity of the pellet. Due to expansion, the ablation pressure decreases with distance from the pellet, until at some distance the ablation pressure become comparable to the magnetic pressure and further expansion is arrested. Beyond that distance, there is little to no current flow as the expansion ceases and the ionized gas is forced to flow along the magnetic field. In some embodiments, the high electrical conductivity in the pellet and the finite conductivity of outward flowing ablation material can prolong the diffusion time of the magnetic field into the pellet. The exemplary model calculates the time for the magnetic field to soak into the pellet and finds that during the shielding period the ablation rate of the pellet can be significantly reduced, about 4-6 times in the magnetic fusion device plasmas. As shown in FIGS. 4A-4D, the magnetic field strength is greatly reduced near the surface of the pellet along with the heat flux which is directly proportional to the intensity of the field.

Figure 5:
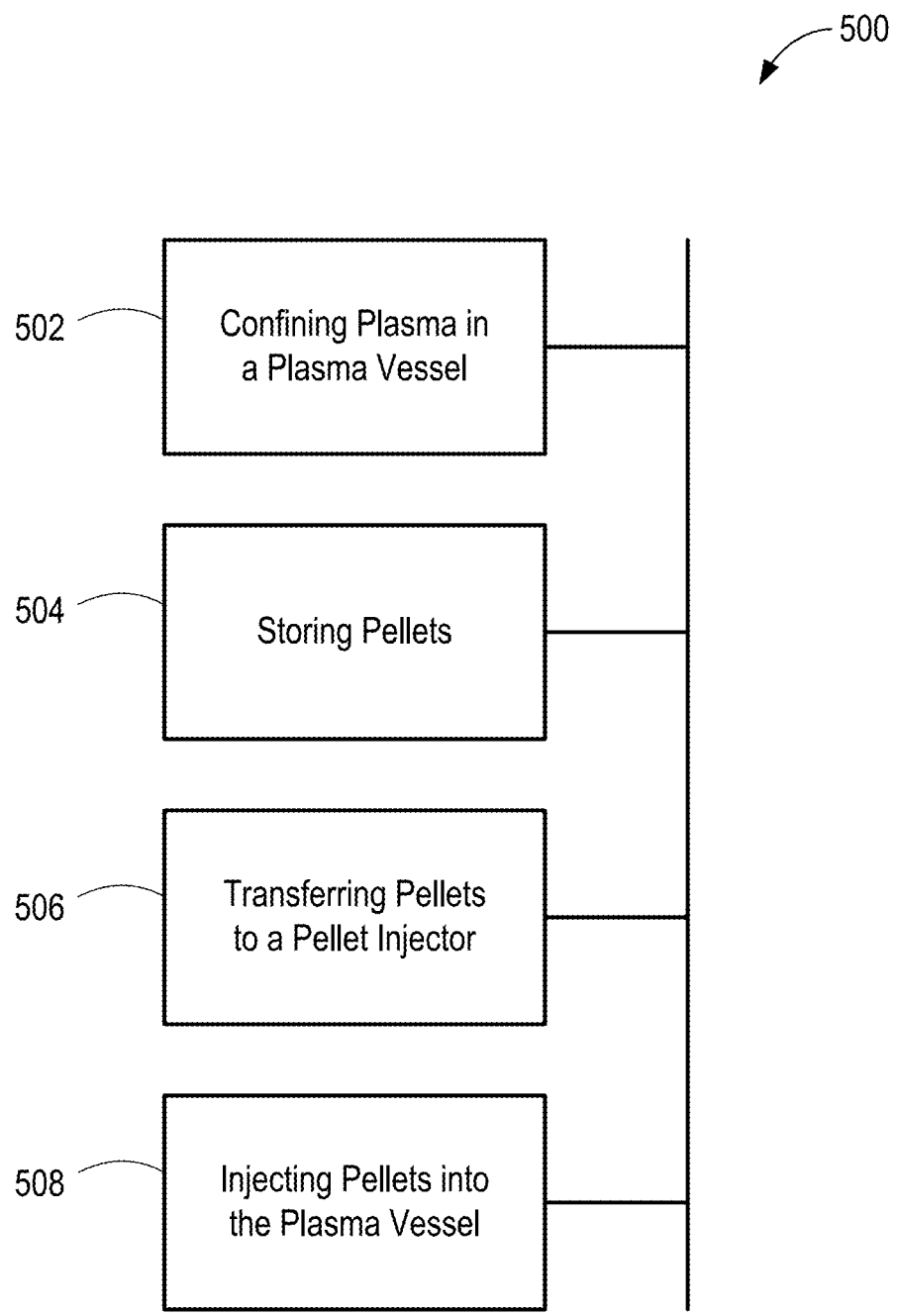
FIG. 5 illustrates an exemplary method of injecting a pellet in a magnetic fusion device.

FIG. 5 illustrates an exemplary method (500) of adding the exemplary pellets in a magnetic fusion device. The exemplary method comprises a confining operation (502) where a magnetic cage of is used to confine plasma in a plasma vessel. In the storing operation (504), the exemplary pellets are stored in a pellet storage device. In an optional transferring operation (506), a pellet transfer device can transfer the pellets from the pellet storage device to a pellet injector. In the injecting operation (508), a pellet injector can inject the pellets into the plasma vessel to expose the pellets to the plasma. In some embodiments, a cooling operation may also be performed prior to the transferring operation (506). The cooling operation may include using a cryostat storage device to cool the pellets.

The exemplary embodiments pertain to methods for enhancing the penetration depth of a projectile injected into hot plasma in a plasma confinement device, for example, a tokamak plasma device. The injection of impurity particles deep in the plasma may protect the plasma confinement device against severity of plasma disruption events. In some embodiments, the disclosed technology uses the injection of metallic impurity pellets to achieve a controlled plasma shutdown by radiating away the plasma thermal energy over a large area. The disclosed technology also enables the capacity for deep penetration by engaging the phenomena of magnetic shielding. The magnetic shielding refers to the strong diamagnetic property of metallic materials when cooled to cryogenically low temperatures where the electrical resistance becomes extremely small, thereby increasing the electrical conductivity. The diamagnetic property is not permanent. However the duration of the effect of the diamagnetic property at low temperatures is such that the confining magnetic field which confines the plasma will be excluded from the interior of the pellet during its transit through the plasma, which in turn temporarily shields the pellet from the intense plasma heat flux.

Figure 6:
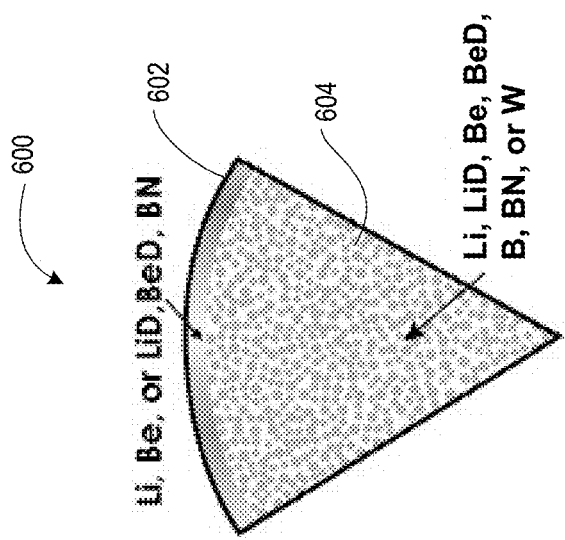
FIG. 6 shows a cross-section of another exemplary pellet.

FIG. 6 shows a cross section of another exemplary pellet, such as a shell pellet that may be used in the magnetic fusion device without cryogenic treatment. The exemplary shell pellets can be stored in a storage device and can be sent to the pellet injector using a pellet transfer device that sends the exemplary pellets to the plasma vessel. The exemplary shell pellet (600) includes an outer shell (602) and the payload (604) that may include densely packed granules or a porous material. In some embodiments, a thin-shelled hollow pellet (600) is filled with payload (604) such as small granules in the size range of 10 to 200 microns. The small granules may be of a metallic or insulating material, which may serve as the payload for the shell pellet. The shell (602) undergoes ablation while in flight through the hot plasma while shielding the interior payload from the plasma heat flux until at some specified point deeper inside the plasma the shell (602) disintegrates exposing the payload (604) to the plasma. Once that happens, the particles begin to heat up and melt or vaporize. In the molten state, the granules may undergo fragmentation into smaller droplets due to the shearing action of a non-uniform surface ablation pressure. Solid pellets do not break up because the shear strength of the pellet material usually exceeds the ablation pressure non-uniformity. As fragmentation into smaller particles greatly increases the surface to volume ratio, both frictional deceleration and ablation (mass loss) rates dramatically increase. As a result the particle payload substance can be more easily dispersed and trapped inside a radiatively cooled plasma, enabling plasma densification.

In some embodiments, the shell (602) encapsulating the payload (604) may include a low-Z material of a desired or adequate structural strength to withstand acceleration forces in the pellet injection tube without breaking up. The materials for the exemplary shell (602) may include, for example, light metals such as lithium (Li), or beryllium (Be), or related insulating compounds, such as lithium deuteride (LiD), or beryllium deuteride (BeD), or boron nitride (BN). In some embodiments, the payload (604) inside shells may include similar materials as their shells, including, for example, lithium (Li), lithium deuteride (LiD), beryllium (Be), beryllium deuteride (BeD), boron (B), boron nitride (BN), or tungsten (W).

The chemical compositions for the cooled pellets and non-cooled pellets can be designed or chosen to reduce or minimize contaminates into the plasma vessel. For example, lithium may be used on the inner walls of some plasma vessels to improve overall plasma performance. The exemplary shells and payloads of the exemplary pellets for such plasma vessels can include lithium that can mitigate plasma disruption and can minimize introducing contaminates into the plasma vessel. Similarly, for non-cooled pellets, the use of the light metals, such as lithium can also minimize unwanted elements inside the vacuum vessel.

A benefit of using light metal low-Z pellets is that low-Z pellets can be cryogenically cooled to engage the magnetic screening effect as described in this patent document. A benefit of using pellets comprising insulating compounds is that they allow for a higher heat of vaporization and heat of dissociation for the molecular compounds which reduces the ablation rate and promotes deeper penetration. Another benefit of using low-Z shells is that such use allows the plasma to radiatively cool at a slower rate. Resistive Magnetohydrodynamics (MHD) theory warns to be careful not to cool the plasma on the q=2 magnetic resonance surface by lingering impurities. Otherwise, a resistive kink or tearing mode can destroy the outer magnetic surfaces and trigger an inward propagating cooling front. Accordingly, cooling from the inside out is preferred over cooling from the outside in because the central region of the plasma has fewer rational or unstable magnetic surfaces than the outer regions.

The ablated and ionized particles cause the plasma to undergo a radiatively driven thermal collapse in the deeper regions of the plasma. The particulates can also dissipate runaway electrons, stunting the seed runaways that can amplify by the avalanche knock-on effect into large and dangerous runaway electron currents.

Based on simulations, when the plasma is cooled from fusion temperatures (e.g., approximately 20,000 eV) down to lower temperatures (e.g., approximately 30-100 eV), the initially densely packed particles may still rapidly break up into smaller clusters which then recursively fission into smaller and smaller ones, until individual dust particles eventually become exposed to the plasma. An estimate of the disassembly time can be given as follows. The time to cause the first fission of the initial payload cluster is roughly $\tau_{f0}=R_0/c_0$ where $R_0$ is the initial pellet radius and $c_0=\alpha\sqrt{p_0/\rho}$ is a sound time with $p_0$ being the surface ablation pressure exerted over the initial payload cluster $\rho$ is the dust mass density including the void space and $\alpha<1$ is an asymmetry coefficient. After n fissions the number of densely packed particle clusters or blobs will be $2^n$. It is further assumed that: (1) mass is conserved (neglect blob ablation); (2) each blob is spherical in shape; and (3) $\rho$ and $\alpha$ for all of the blobs remains constant. Given that the ablation pressure scales with the blob radius as $\rho \propto R^{-1/3}$, the time for the original payload to disperse in this way becomes $$\tau_{frag} = \tau_0 \sum_{n=0}^{\infty} \left(\frac{1}{2}\right)^{7n/18} = \frac{\tau_0}{1-(1/2)^{7/18}} = 4.2322\,\tau_0$$

Taking the initial payload cluster to be the diameter of the pellet, for example, D=1.5 cm, and $\rho$~1 g/cm$^3$, the ablation pressure in a plasma cooled to 100 eV plasma is approximately 1 MPa, giving the fragmentation time of about 1 ms, which is sufficiently short if the pellet speed is <500 m/s.

Penetration of dispersed individual dust particles will be limited by both deceleration and mass loss (ablation). The faster vaporization rate is due to the extremely small particle size; the lifetime being proportional to $\tau_{life} \propto D^3/G \propto D^{5/3}$ (where D and G are the grain diameter and mass ablation rate, respectively) assures that isolated granules will completely ablate inside a warm 30-100 eV plasma rather than hitting the opposite wall. The particulates are also contained inside the plasma by friction stopping. In some embodiment, the size of the fine grains or dust may be approximately 10 microns, much less than the Debye length of the ambient plasma. Then the Coulombic drag force on an isolated dust grain can be calculated from the orbital motion limited (OML) treatment. Assuming that the initial dust particle velocity relative to the plasma is equal to the original pellet velocity $V_{pellet}$ approximately 500 m/s. Since $V_{pellet}$ is much less than the thermal speed of the ions and electrons even for a 10-100 eV thermally collapsed plasma, the Coulombic drag force on a moving dust particle is largely due to its interaction with the background plasma ions. The stopping time r of a dust grain moving relative to the background ions is therefore analogous to the slowing down time of a fast (MeV) ion test particle moving through a hot electron plasma, in the sense that the scaling is similar: $\tau \propto T^{3/2}/Z_d^2$, where T is the temperature of the target particles and $Z_d$ is the charge on the dust grain (test particle). The 3/2 temperature scaling is familiar, and it indicates that the stopping time shortens as the plasma radiatively cools, except in the case of a dust grain it adopts a potential, the floating potential, so that its charge $Z_d$ also depends on plasma temperature T.

Putting this all together, a slowing down time in a hydrogenic plasma is shown below:

$$\tau = \frac{7.685 \times 10^{22} \rho_d r}{n \ln \Lambda (MT)^{1/2} \psi^2}$$

where n(m$^{-3}$), T(eV), and M(amu) is the plasma ion density, temperature, and ionic mass, respectively, $\rho_d$(kg/m$^3$) is the mass density of the material in the dust grains, r(m) is the grain radius, and $\psi$~2-5 is the floating potential normalized to the ion temperature, and ln $\Lambda$ approximately 10 is the Coulomb logarithm. As an example, taking fusion parameters such as T=100 eV and n=10$^{20}$ m$^{-3}$, we get $\tau$=0.6 ms, so in some embodiments, a stopping distance for pellet speed of approximately 500 m/s may be 30 cm. Therefore, any unablated dust particles can be easily trapped inside plasma with minor radius of 0.66 m.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of mitigating plasma disruption, comprising:
   magnetically confining plasma in a plasma vessel;
   storing cooled pellets; and
   injecting the cooled pellets into the plasma vessel at a known velocity from a location that has an absence of a magnetic field from the plasma vessel.

2. The method of claim 1,
   wherein the cooled pellets are cooled to less than or equal to 40 kelvin (K).

3. The method of claim 2, wherein the stored cooled pellets are cooled to 10 kelvin (K).

4. The method of claim 2, the pellets comprise solid pellets.

5. The method of claim 2, comprising using hollow shell pellets as the pellets.

6. The method of claim 5, wherein each hollow shell pellet encapsulates a payload.

7. The method of claim 6, wherein the payload comprises granules or a porous material.

8. The method of claim 6, wherein the payload comprises lithium, lithium deuteride, beryllium, beryllium deuteride, boron, boron nitride, or tungsten.

9. The method of claim 2, wherein each pellet includes lithium.

10. The method of claim 1, comprising using a hollow shell encapsulating a payload as the pellets.

11. The method of claim 10, wherein the hollow shell comprises lithium, lithium deuteride, beryllium, beryllium deuteride, or boron nitride.

12. The method of claim 10, wherein the payload comprises lithium, lithium deuteride, beryllium, beryllium deuteride, boron, boron nitride, or tungsten.

13. The method of claim 2, wherein each pellet includes beryllium.

* * * * *